(No Model.)

D. B. MERRELL.
MANURE SPREADER.

No. 341,493. Patented May 11, 1886.

Witnesses.
E. Horton
L. J. Wilkin

Inventor.
Daniel B. Merrell
Per. E. Horton
Attorney

N. PETERS, Photo-Lithographer, Washington, D. C.

UNITED STATES PATENT OFFICE.

DANIEL B. MERRELL, OF CRYSTAL SPRING, NEW YORK.

MANURE-SPREADER.

SPECIFICATION forming part of Letters Patent No. 341,493, dated May 11, 1886.

Application filed June 17, 1885. Serial No. 169,002. (No model.)

*To all whom it may concern:*

Be it known that I, DANIEL B. MERRELL, a citizen of the United States, residing at Crystal Spring, in the county of Yates and State of New York, have invented new and useful Improvements in Manure-Spreaders, of which the following is a specification.

My invention relates to manure-spreaders in which a revolving-cylinder spreader operates in conjunction with an intermittent feeding-carriage; and the objects of my improvements are, first, to so arrange its parts and driving mechanism that it may be readily set upon and driven by the wheels of a common farm-wagon; second, to avoid clogging of cylinder while spreading by the introduction of an intermittent feed; and, third, in its general details of construction so as to produce a cheaper machine than any heretofore made.

I attain these objects by the device illustrated in the accompanying drawings, forming a part of this specification, in which—

Figure 1:
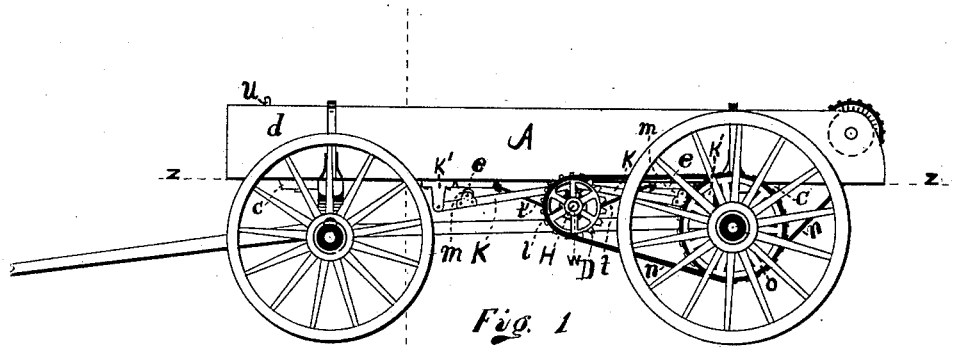
Figure 2:
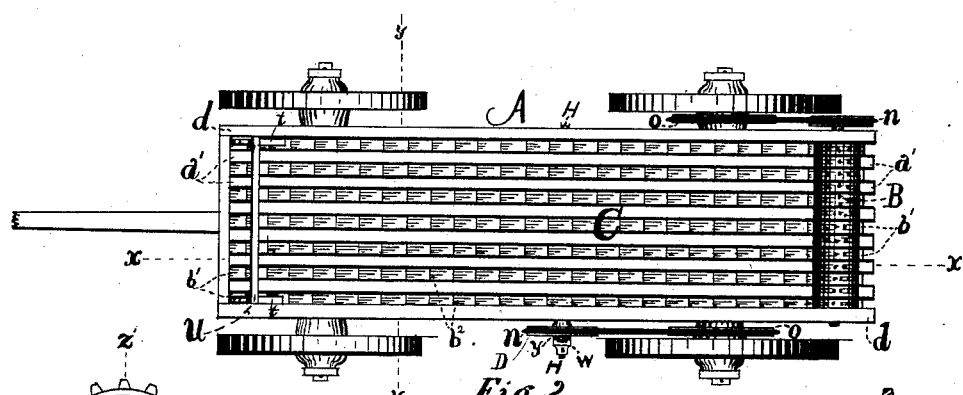
Figure 6:
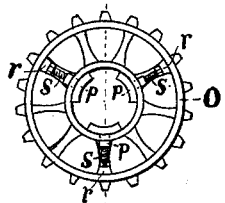
Figures 5, 7:
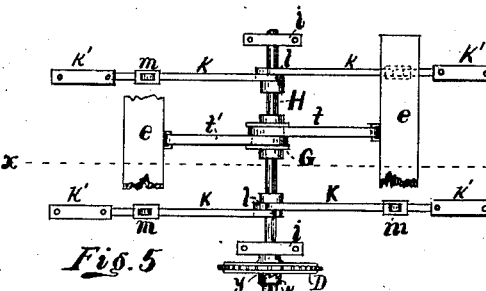
Figure 3:
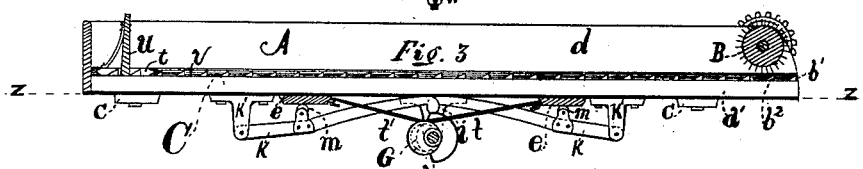
Figure 4:

Figure 1 is an elevation of spreader set upon or attached to a farm-wagon. Fig. 2 is a plan view of same. Fig. 3 is a longitudinal vertical section on the line $x\ x$, Figs. 2, 5, of spreader only. Fig. 4 is an end elevation in section on the line $y\ y$, Fig. 2. Fig. 5 is a detached plan view of carriage-reciprocating mechanism on the line $z\ z$, Figs. 1, 3. Fig. 6 is an enlarged detail side view of chain drive-wheel, to show manner of construction for rigid attachment to the hub of any ordinary wagon-wheel by its inwardly-moving jaws. Fig. 7 is a central cross-section of same on the line $z'\ z'$.

Similar letters refer to similar parts.

A represents the manure carriage or box, made similar to an ordinary wagon-box, having bottom, sides, and forward end. The rear end, aside from a revolving cylinder, B, is left open for distribution of manure moved by the reciprocating bottom upon said cylinder, the operation of which I will explain more fully hereinafter.

The bottom of the box A is made by placing lengthwise alternately stationary strips $a'$ and reciprocating strips $b'$. These latter strips $b'$ are some shorter than the strips $a'$, and have upon their upper edge throughout their entire length a series of teeth, $b^2$, inclining upward and backward toward the cylinder B. These teeth may be made by the insertion of spikes or pegs, or by cutting into the strips, as shown in the drawings. The strips $a'$ are made rigidly a part of the box by being bolted to cross-pieces $c\ c$ underneath, which in turn are bolted up to the box-sides $d\ d$, while the strips $b'$, resting upon the same cross-pieces $c\ c$, are moved in unison by being secured together in the same manner to cross-pieces $e\ e$, which are independent of the box, but receive a reciprocating movement by draw-rods or pitmen $f\ f'$, connected to them, and an eccentric, $g$, (about which they partially encircle) upon a shaft, H, having its bearings in arms $i\ i$, centrally secured to and beneath the box-sides $d\ d$. This series of strips $b'$ and their cross-pieces $e\ e$, as arranged together, for convenience I will now term "carriage" C.

In order that the contents of the box may be surely moved toward the cylinder for distribution, it is necessary that the carriage C, in its reciprocation toward the cylinder B, should rise at least the depth of the teeth $b^2$ above the stationary strips $a'$, and in returning drop as much below. This method of moving contents of box upon cylinder at intervals, which I term an "intermittent feed," prevents clogging, which is not the case with other manure-spreaders having a continuous feed. This rising and falling of the carriage C as it reciprocates back and forth I accomplish by four similar levers, $k$, having their outer ends pivoted to as many arms $k'$, supported from the box-sides $d\ d$ in quarterly directions from eccentric $g$, underneath and outside of the cross-pieces $e\ e$, the inner ends of said levers $k$ resting in pairs upon eccentric cams $l\ l$ upon shaft H. A small truck, $m$, is borne upon each lever, directly under the cross-pieces $e\ e$, with which they come in contact, raising the carriage C as the levers $k$ are raised by cams $l\ l$, while the eccentric $g$, through medium of rod $f'$, moves the carriage C and its load backward while upon the trucks $m$. Now, as the shaft H has made one-half revolution and the carriage C has reached its extreme rearward movement, the cams $l\ l$ are so shaped as to allow the carriage, through the levers, to drop upon cross-pieces $c\ c$. The eccentric $g$ has also made one-half revolution, and if properly adjusted at this time begins to move the carriage, through the rod $f$ back to its forward position, where it is again raised by the cams $l\,l$, and so on, while the shaft H, as well as cylinder B, has a continuous rotation imparted by chain belts $n$, running from like detachable chain-wheels O, firmly secured to the hubs of the rear wagon-wheels. This chain-wheel, Figs. 5 and 6, is made detachable by having cast in it radial ways, in which inwardly-adjusting jaws P fit and slide, and are moved by the turning of screws $s$, screwed into them and resting in sockets $r$ within the rim. An extra end board, $u$, has braced and bolted at right angles across its lower corners runners $t\,t$, running in horizontal grooves $v\,v$, cut within the box in the box-sides $d\,d$. This end board is moved back with contents of box by the teeth $b^2$ of the carriage C catching it in turn as they rise up and move back, as heretofore described. In going to and from the field, also in running the wagon backward, it becomes necessary to throw the mechanism out of gear. This I accomplish in the most simple manner by placing upon the shaft H a driving, yet sliding, clutch-half, $w$, fitting into the clutch-half $y$, which forms the hub of chain-wheel D. To operate I throw the clutch-half $w$ in or out of mesh by hand.

The cylinder B, I make in the usual way best adapted to the spreading of manure.

I am aware that a manure-spreader has been set upon wheels of its own, in cart-fashion, having a continuous feeding-carriage bed, operated in conjunction with a revolving cylinder or pitching-spreaders; also, thrashing-straw carriers or walking-rakes having reciprocating carriage-beds for the purpose of separating grain from straw. Such I do not claim, as in neither is combined a reciprocating carriage-bed with proper mechanism for moving a load of manure at intervals upon a continuous-revolving cylinder for distribution. Therefore,

Having thus fully described my improvements, what I claim, and wish to secure by Letters Patent, is—

1. A manure-box having bottom of stationary strips $b$ and reciprocating strips $b'$, cross-pieces $e\,e$ and $c\,c$, in combination with draw-rods $f\,f'$, eccentric G, and shaft H, arranged to operate in the manner as shown and described.

2. A manure-box having bottom of stationary strips $b$ and reciprocating strips $b'$, cross-pieces $e\,e$ and $c\,c$, in combination with end board, $u$, having horizontal runners $t\,t$, and cylinder B, all arranged to operate together, substantially as described.

3. The reciprocating carriage C of the manure-box A, in combination with trucks $m$, levers $k$, and arms $k'$, arranged to operate as set forth.

4. Shaft H, bearing chain-wheel D, cams $l\,l$, and eccentric G, in combination with levers $k$, trucks $m$, and draw-rods $f\,f'$, substantially as described.

5. In a manure-spreader, as a detachable driver, the chain-wheel O, having sockets $r$ within its rim, in combination with inwardly-moving jaws P, actuated by screws $s$, seated within said sockets, in the manner substantially as shown and described.

6. In a manure-speader, the wagon-wheels having the chain-wheels O rigidly secured to them by their inwardly moving or gripping jaws P, in combination with chains $n\,n$, cylinder B, and shaft H, having chain-wheels attached, arranged to operate the mechanism in conjunction, substantially as shown and described.

DANIEL B. MERRELL.

Witnesses:
E. HORTON,
L. J. WILKIN.